(12) United States Patent
Wasamoto et al.

(10) Patent No.: US 10,286,640 B2
(45) Date of Patent: May 14, 2019

(54) PROCESS FOR LAMINATING WORKS TOGETHER

(71) Applicant: Ushio Denki Kabushiki Kaisha, Tokyo (JP)

(72) Inventors: Makoto Wasamoto, Tokyo (JP); Fumitoshi Takemoto, Tokyo (JP); Shinji Suzuki, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/559,372

(22) PCT Filed: Feb. 25, 2016

(86) PCT No.: PCT/JP2016/055580
§ 371 (c)(1),
(2) Date: Sep. 18, 2017

(87) PCT Pub. No.: WO2016/147828
PCT Pub. Date: Sep. 22, 2016

(65) Prior Publication Data
US 2018/0072034 A1   Mar. 15, 2018

(30) Foreign Application Priority Data

Mar. 19, 2015   (JP) .................................. 2015-055676

(51) Int. Cl.
*B29C 65/00* (2006.01)
*B32B 37/10* (2006.01)
(Continued)

(52) U.S. Cl.
CPC .......... *B32B 37/1018* (2013.01); *B29C 59/14* (2013.01); *B29C 59/16* (2013.01);
(Continued)

(58) Field of Classification Search
CPC ..... B29C 65/02; B29C 65/1046; B29C 65/72; B29C 66/0242; B29C 66/028;
(Continued)

(56) References Cited

U.S. PATENT DOCUMENTS

2006/0042545 A1* 3/2006 Shibata ............. H01J 37/32009
118/722
2010/0233383 A1* 9/2010 Srdanov ............ H01L 51/0003
427/535
(Continued)

FOREIGN PATENT DOCUMENTS

JP    3714338 B2    11/2005
JP    2006-187730 A   7/2006
(Continued)

OTHER PUBLICATIONS

Obara, translation of JP2006-187730 (Year: 2006).*
(Continued)

*Primary Examiner* — Mark A Osele
*Assistant Examiner* — Nickolas R Harm
(74) *Attorney, Agent, or Firm* — Studebaker & Brackett PC (57) ABSTRACT

An object of the present invention is to provide a process for laminating works together that are capable of giving laminates a high bonding strength ensured therein. The process for laminating works together laminates a work composed of a resin to a work composed of a resin or glass, the process including a surface activation step of treating a laminating surface of at least the work composed of a resin with vacuum ultraviolet ray or with atmospheric pressure plasma, and a bonding step of bonding together the two works stacked on each other such that a laminating surface of one of the works abuts a laminating surface of the other work, wherein in the surface activation step, the treatment of the laminating (Continued)

surfaces with vacuum ultraviolet ray or with atmospheric pressure plasma is terminated when an accumulated treatment quantity of the vacuum ultraviolet ray or the atmospheric pressure plasma applied to the laminating surfaces is within an initial drop range shown in a variation curve of a water contact angle on the laminating surfaces with respect to the accumulated treatment quantity.

3 Claims, 5 Drawing Sheets

(51) Int. Cl.
*B32B 27/08* (2006.01)
*B32B 37/06* (2006.01)
*B32B 38/00* (2006.01)
*B29C 59/14* (2006.01)
*B29C 59/16* (2006.01)
*B29C 65/14* (2006.01)
*B29C 65/72* (2006.01)
*B29C 65/02* (2006.01)
*B29L 31/00* (2006.01)
*B29C 35/08* (2006.01)

(52) U.S. Cl.
CPC .............. *B32B 27/08* (2013.01); *B32B 37/06* (2013.01); *B32B 38/0008* (2013.01); *B29C 65/02* (2013.01); *B29C 65/1406* (2013.01); *B29C 65/72* (2013.01); *B29C 66/028* (2013.01); *B29C 66/71* (2013.01); *B29C 66/7465* (2013.01); *B29C 2035/0827* (2013.01); *B29K 2995/0092* (2013.01); *B29L 2031/756* (2013.01); *Y10T 156/1089* (2015.01); *Y10T 156/1092* (2015.01); *Y10T 156/14* (2015.01); *Y10T 156/1744* (2015.01)

(58) Field of Classification Search
CPC ......... Y10T 156/1089; Y10T 156/1092; Y10T 156/14; Y10T 156/1744
USPC .......................... 156/308.6, 309.9, 322, 535
See application file for complete search history.

(56) References Cited

U.S. PATENT DOCUMENTS

2012/0205387 A1* 8/2012 Manabe .................... B32B 7/12
220/626
2017/0036419 A1* 2/2017 Adib .................... B32B 17/064

FOREIGN PATENT DOCUMENTS

| JP | 2007-130836 A | 5/2007 |
| JP | 2008-019348 A | 1/2008 |
| JP | 5152361 B2 | 2/2013 |
| JP | 2014-024340 A | 2/2014 |
| WO | 2008/087800 A1 | 7/2008 |
| WO | 2011/010738 A1 | 1/2011 |
| WO | 2014/051054 A1 | 4/2014 |

OTHER PUBLICATIONS

International Search Report issued in PCT/JP2016/055580; dated May 17, 2016.
An Office Action; "Notice of Reasons for Rejection," mailed by the Japanese Patent Office dated May 23, 2017, which corresponds to Japanese Patent Application No. 2016-541689 and is related to the present application; with English language Concise Explanation.
An Office Action; "Decision to Grant a Patent" issued by the Japanese Patent Office dated Jul. 18, 2017, which corresponds to Japanese Patent Application No. 2016-541689 and is related to the present application; with English language Concise Explanation.

* cited by examiner

PROCESS FOR LAMINATING WORKS TOGETHER

TECHNICAL FIELD

The present invention relates to processes for laminating together works composed of synthetic resins, glass, silicon wafers, crystals or sapphire.

BACKGROUND ART

In biochemistry fields, technique using a microreactor for e.g., separation, synthesis, extraction or analysis of a minuscule quantity of reagents have been recently attracting attention. The microreactor is composed of a microchip having a small substrate composed of e.g., silicon, a silicone resin or glass on which a channel for analysis at a micro scale is formed by a semiconductor micro fabricating technique.

A reaction analysis system using such a microreactor is referred to as a micro total analysis system (hereinafter called "µTAS"). The µTAS provides effects such as the increase in a ratio of a surface area to a volume of reagents, and therefore enables a reaction analysis at a high speed with high precision leading to the provision of a compact and automated system.

Allowing the microchip to include a flow path called a microchannel which has regions exerting various functions, such as a reaction region having a reagent placed thereon, makes it possible to form microchips employable in various applications, the applications including analysis in the fields of chemistry, biochemistry, pharmacy, medical science and veterinary science, such as genetic analysis, clinical diagnosis and drug screening, synthesis of compounds and environmental measurements.

Such microchips have a typical structure in which a pair of substrates facing each other are bonded to each other, with the surface of at least one of the substrates having a microchannel (approximately measuring, e.g., from ten to several hundred micrometers in width, from ten to several hundred micrometers in depth). A substrate for forming the microchips used in most cases is a glass substrate, which is readily reproducible and allows for optical detection. Also, recent years have seen the ongoing development of microchips made of a resin substrate, which is lightweight, more unlikely to break than the glass substrate, and is inexpensive.

Conceivably, processes for laminating substrates together in the production of microchips involve the use of an adhesive or the use of heat sealing, and yet these processes have problems as follows.

Problems with the lamination process using an adhesive include the adhesive's exuding into the microchannels thereby clogging the microchannels or narrowing part of the microchannels, consequently causing the channels to have a non-uniform diameter; and disordering homogenous properties of wall surfaces of the channels.

Problems with the lamination process using heat sealing include the crushing of channels during a heating stage caused by the sealing carried out at a temperature exceeding heat melting temperature, and the failure of channels to retain a predetermined cross-sectional shape, which would lead to the difficulty in giving the microchip higher functions.

In view of the above circumstances, a method proposed recently is the application of vacuum ultraviolet ray onto the surface of the substrates thereby activating the surface of the substrates, and then laminating the resultant substrates together (see Patent Literatures 1 to 5).

CITATION LIST

Patent Literatures

[Patent Literature 1] JP-B-3714338
[Patent Literature 2] JP-A-2006-187730
[Patent Literature 3] JP-A-2008-19348
[Patent Literature 4] WO 2008/087800 A1
[Patent Literature 5] JP-B-5152361

SUMMARY OF INVENTION

Technical Problem

Still, conventional lamination processes have been found to have a problem in some cases in terms of failing to give laminates a high bonding strength in spite of the surfaces of the substrates having being irradiated with a sufficient quantity of ultraviolet ray.

An object of the present invention is therefore to provide processes for laminating works together that are capable of giving laminates a high bonding strength ensured therein.

Solution to Problem

The present inventors through their earnest considerations of the above-identified problem have found that the excessive application of an accumulated luminous quantity of ultraviolet ray onto the laminating surfaces of works would reduce the bonding strength of the resultant laminates. Based on that finding, the present invention has been completed.

Specifically, the process for laminating works together according to the present invention is a process for laminating together a first work composed of a resin and a second work composed of a resin, the process comprising:

a surface activation step of treating a laminating surface of the first work and a laminating surface of the second work with vacuum ultraviolet ray or with atmospheric pressure plasma, and a bonding step of bonding the first work to the second work stacked on each other such that the laminating surface of the first work abuts the laminating surface of the second work, the bonding carried out by any one of methods (1) to (4) below, wherein in the surface activation step, the treatment of the laminating surfaces with vacuum ultraviolet ray or with atmospheric pressure plasma is terminated when an accumulated treatment quantity of the vacuum ultraviolet ray or the atmospheric pressure plasma applied to the laminating surfaces is within an initial drop range shown in a variation curve of a water contact angle on the laminating surfaces with respect to the accumulated treatment quantity, (1): a method of heating the first work and the second work, (2): a method of pressurizing the first work and the second work in the direction of thickness of the works, (3): a method of heating the first work and the second work while pressurizing the first and second works in the direction of thickness of the works, and (4): a method of pressurizing the first work and the second work in the direction of thickness of the works, followed by releasing the pressure, and thereafter heating the works.

In the process for laminating works together according to the present invention, it is preferable in the surface activation step that the treatment of the laminating surfaces with vacuum ultraviolet ray or with atmospheric pressure plasma be terminated before a water contact angle on the laminating surfaces becomes below 30°.

It is also preferable in the surface activation step that the treatment of the laminating surfaces with vacuum ultraviolet ray or with atmospheric pressure plasma be terminated after a water contact angle on the laminating surfaces becomes below an initial water contact angle given prior to the surface activation step.

It is preferable that a resin constituting the first work and the second work is a cycloolefin resin, an acrylic resin, or a silicone resin.

Advantageous Effects of Invention

In the surface activation step included in the process for laminating works together according to the present invention, the treatment of the laminating surfaces with vacuum ultraviolet ray or with atmospheric pressure plasma is terminated when an accumulated treatment quantity of the vacuum ultraviolet ray or the atmospheric pressure plasma applied to the laminating surfaces of the works is within an initial drop range shown in a variation curve of a water contact angle on the laminating surfaces with respect to the accumulated treatment quantity. This ensures the resultant laminates to have a high bonding strength.

DESCRIPTION OF EMBODIMENTS

Embodiments of processes for laminating works together according to the present invention will be described hereinafter.

[Work]

The processes for laminating works together according to the present invention include, for example, a process for laminating two planar works together. The two works applied in the lamination process according to the present invention consist of one work composed of a resin, and the other work composed of a resin or glass, and may be composed of the same material or of materials different from each other.

Employable examples of resins forming the works include such silicone resins as polydimethylsiloxane, cycloolefin resins and acrylic resins.

Employable examples of glass forming the works include quartz glass, sapphire glass, alkali glass and borosilicate glass.

[Steps]

The process for laminating works together according to the present invention includes a surface activation step of treating a laminating surface of at least the work composed of a resin with vacuum ultraviolet ray or with atmospheric pressure plasma, and a bonding step of bonding together the two works stacked on each other such that a laminating surface of one of the works abuts a laminating surface of the other work. In the surface activation step, the treatment only on works made of a resin is sufficient, but if a work made of a resin and a work made of glass are laminated together, both of the two works may undergo the treatment.

Hereinafter, the surface activation step using vacuum ultraviolet ray is referred to as the "ultraviolet ray treatment step", and the surface activation step using atmospheric pressure plasma is referred to as the "plasma treatment step". The surface activation step refers to either the ultraviolet ray treatment step or the plasma treatment step.

[Ultraviolet Ray Treatment Step]

The ultraviolet ray treatment step is carried out by irradiating a laminating surface of at least the work composed of a resin with vacuum ultraviolet ray with a wavelength of 200 nm or less.

Light sources for the application of vacuum ultraviolet ray that may be preferably used include an excimer lamp such as a xenon excimer lamp with a bright line having a wavelength of 172 nm, a low-pressure mercury lamp with a bright line having a wavelength of 185 nm, and a deuterium lamp with a bright line falling within a wavelength range from 120 to 200 nm.

In the ultraviolet ray treatment step, the accumulated luminous quantity of vacuum ultraviolet ray applied onto the laminating surfaces of the works is an accumulated quantity of treatment with vacuum ultraviolet ray applied onto the laminating surfaces. When the accumulated treatment quantity (accumulated luminous quantity) is within an initial drop range shown in a variation curve of a water contact angle on the laminating surfaces with respect to the accumulated treatment quantity (hereinafter, also called "contact angle/accumulated treatment quantity variation curve"), the treatment of the laminating surfaces of the works with vacuum ultraviolet ray (application of vacuum ultraviolet ray) is terminated.

Terminating the application of vacuum ultraviolet ray onto the laminating surfaces of the works when the accumulated treatment quantity is outside the initial drop range shown in the contact angle/accumulated treatment quantity variation curve would make it difficult for the resultant laminates to have a high bonding strength.

In the ultraviolet ray treatment step, the initial drop range shown in the contact angle/accumulated treatment quantity variation curve is determined in such a manner as described below.

First, each time an accumulated luminous quantity on a laminating surface of a work, being irradiated with a given illuminance of vacuum ultraviolet ray, reaches a predetermined value, a water contact angle on that laminating surface is measured. The measured values given of the water contact angle are plotted on a coordinate with its vertical axis representing a contact angle and its horizontal axis representing an accumulated luminous quantity. In the resultant graph, a range of measured values in which measured values given of the water contact angle drops nearly proportionally to the accumulated luminous quantity is selected to determine an approximate line of a group of the selected measured values (called "approximate line A" hereinafter). Meanwhile, in the resultant graph, a range of measured values each of which is only a little different from a value previously measured is selected to determine an approximate line of a group of the selected measured values (called "approximate line B" hereinafter). A point at which the approximate line A and the approximate line B intersect is defined as a displacement point. A range from a starting point of the application of the vacuum ultraviolet ray to the displacement point is referred to as the initial drop range.

In the ultraviolet ray treatment step, it is preferable that the application of vacuum ultraviolet ray onto the laminating surfaces of the works be terminated before a water contact angle on the laminating surfaces of the works becomes below 30°. Terminating the application of vacuum ultraviolet ray onto the laminating surfaces of the works after a water contact angle on the laminating surfaces of the works becomes below 30° would make it difficult for the resultant laminates to have a high bonding strength in some cases.

In the ultraviolet ray treatment step, it is preferable that the application of vacuum ultraviolet ray onto the laminating surfaces of the works be terminated after a water contact angle on the laminating surfaces become below an initial water contact angle given prior to the ultraviolet ray treatment step. Terminating the application of vacuum ultraviolet ray onto the laminating surfaces of the works before a water contact angle on the laminating surfaces become below the initial water contact angle would make it difficult for the resultant laminates to have a high bonding strength in some cases.

The luminance of the vacuum ultraviolet ray to be applied onto the laminating surfaces of the works ranges, for example, from 10 to 100 mW/cm$^2$.

The irradiation time of the vacuum ultraviolet ray to be applied onto the laminating surfaces of the works is determined appropriately within a range where the accumulated luminous quantity on the laminating surfaces fulfills the above-mentioned requirement.

[Plasma Treatment Step]

The plasma treatment step is carried out by exposing the laminating surfaces of at least the work composed of a resin to atmospheric pressure plasma fed from an atmospheric pressure plasma device.

Figure 1:
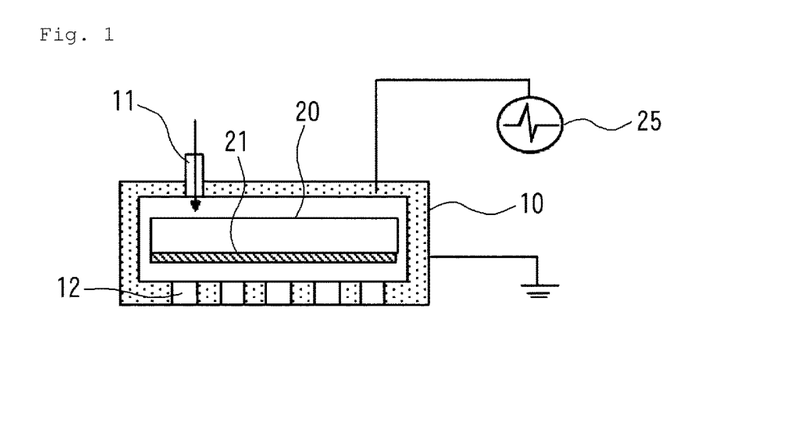
FIG. 1 is a view illustrating a configuration of an example of an atmospheric plasma device.

FIG. 1 illustrates an exemplary configuration of an atmospheric pressure plasma device. The atmospheric pressure plasma device has a rectangular casing 10 formed of, e.g., aluminum. The casing 10 includes a planar electrode 20 horizontally placed that is electrically connected to a high-frequency power source 25. On the lower surface of the electrode 20, a dielectric layer 21 is formed. In this example, the electrode 20 forms a high-pressure side electrode, and the casing 10 forms a grounding side electrode.

Above the casing 10, a gas feeding inlet 11 for feeding gas for plasma generation into the casing 10 is mounted. On the lower surface of the casing 10, multiple nozzles 12 for releasing outside atmospheric pressure plasma occurring within the casing 10.

In the atmospheric pressure plasma device, gas for plasma generation is fed from the gas feeding inlet 11 into the casing 10 under atmospheric pressure or under a pressure near thereto. Application at the above state of a high-frequency electric field by the high-frequency power source 25 to a region between the electrode 20 and the casing 10 via the dielectric layer 21 causes a dielectric barrier discharge between the electrode 20 and the casing 10, leading to the ionization or excitation of the gas for plasma generation present between the casing 10 and the dielectric layer 21, resulting in the generation of atmospheric pressure plasma. The atmospheric pressure plasma generated is released outside from the nozzles 12 of the casing 10.

The gas for plasma generation is preferably the one primarily composed of nitrogen gas or argon gas and containing 0.01 to 5 vol % of oxygen gas. A mixed gas of nitrogen gas and clean dry air (CDA) is also possible.

Electric power supplied from the high-frequency power source 25 has a frequency of 20 to 70 kHz and a voltage of 5 to 15 kVp-p.

The accumulated treatment quantity of the atmospheric pressure plasma applied to the laminating surfaces to be calculated in the plasma treatment step is a product of an electric power applied to the atmospheric pressure plasma device and a treatment time (time of exposure to atmospheric pressure plasma). If the electric power applied to the atmospheric pressure plasma device is constant, the treatment time with atmospheric pressure plasma can be regarded as the accumulated treatment quantity of atmospheric pressure plasma. When the accumulated treatment quantity is within an initial drop range shown in the contact angle/accumulated treatment quantity variation curve, the treatment of the laminating surfaces of the works with atmospheric pressure plasma (exposure to atmospheric pressure plasma) is terminated.

In the plasma treatment step, the initial drop range in the contact angle/accumulated treatment quantity variation curve is determined in such a manner as described below.

First, an atmospheric pressure plasma device gets operated under a given electric power to generate atmospheric pressure plasma, to which a laminating surface of a work is exposed. Each time an accumulated treatment quantity on the laminating surface reaches a predetermined value, a water contact angle on that laminating surface is measured. The measured values given of the water contact angle are plotted on a coordinate with its vertical axis representing a contact angle and its horizontal axis representing an accumulated treatment quantity. In the resultant graph, a range of measured values in which measured values given of the water contact angle drops nearly proportionally to the accumulated treatment quantity is selected to determine an approximate line A of a group of the selected measured values. Meanwhile, in the resultant graph, a range of measured values each of which is only a little different from a value previously measured is selected to determine an approximate line B of a group of the selected measured values. A point at which the approximate line A and the approximate line B intersect is defined as a displacement point. A range from a starting point of the exposure to the atmospheric pressure plasma to the displacement point is referred to as the initial drop range.

In the plasma treatment step, it is preferable that the treatment of the laminating surfaces of the works with atmospheric pressure plasma be terminated before a water contact angle on the laminating surfaces of the works becomes below 30°.

In the plasma treatment step, it is preferable that treatment of the laminating surfaces of the works with atmospheric pressure plasma be terminated after a water contact angle on the laminating surfaces become below an initial water contact angle prior to the plasma treatment step.

[Bonding Step]

The bonding step involves the bonding together of two works stacked on each other such that a laminating surface of one of the works abuts a laminating surface of the other work.

Specific exemplary methods for bonding the two works together include (1) heating two works stacked on each other, (2) pressurizing two works stacked on each other in the direction of their thickness, (3) heating two works while the two works stacked on each other are pressurized in the direction of their thickness, and (4) pressurizing two works stacked on each other in the direction of their thickness, followed by releasing the pressure, and thereafter heating the two works.

Specific conditions in the bonding step are appropriately determined in a range that would not cause any deformation in the works, depending on materials of the works.

Specifically, for example, the heating of two works is implemented at a heating temperature ranging from 100 to 110° C., and the pressurization of two works is implemented at a pressure ranging from 0.2 to 10 MPa.

In the surface activation step included in the process for laminating works together according to the present invention, the treatment of the laminating surfaces with vacuum ultraviolet ray or with atmospheric pressure plasma is terminated when an accumulated treatment quantity of the vacuum ultraviolet ray or the atmospheric pressure plasma applied to the laminating surfaces is within an initial drop range shown in the contact angle/accumulated treatment quantity variation curve. This ensures the resultant laminates to have a high bonding strength.

Reason for the attainment of the above-described effects, though not identified, is presumed to be as follows.

An ultraviolet ray treatment step for instance, due to involving the application of vacuum ultraviolet ray onto laminating surfaces of works, would disintegrate and eliminate organic substances adhering onto the laminating surfaces, as well as oxidize polymers constituting the works on the laminating surfaces of the works thereby introducing OH group to the polymer, consequently activating the laminating surfaces of the works. The establishment of such a state as described above followed by the irradiation of the laminating surface of work with vacuum ultraviolet ray would cause part of the polymer constituting the works to be disintegrated in the proximity of the laminating surfaces of the works. As a result, it would be difficult for two works to attain a high bonding strength in a bonding step.

The present invention implements the termination of the treatment with vacuum ultraviolet ray or with atmospheric pressure plasma when the accumulated treatment quantity is within the initial drop range shown in the contact angle/accumulated treatment quantity variation curve, making it possible to prevent or suppress part of polymers constituting works from being disintegrated. This is believed to be the reason for the attainment of the high bonding strength ensured in the two works in the bonding step.

EXAMPLES

Examples of processes for laminating works together according to the present invention will be specifically described without limiting the present invention to those examples described below.

[Fabrication of Works]

Works A to C shown below were fabricated.

Work A is a rectangular planar piece composed of a cycloolefin resin ("ZEONEX 480R" manufactured by Zeon Corporation) with a dimension of 25 mm×45 mm×3 mm Work B is a rectangular planar piece composed of an acrylic resin ("SUMIPEX" manufactured by Sumitomo Chemical Co., Ltd.) with a dimension of 25 mm×45 mm×2 mm Work C is a rectangular planar piece composed of a silicone resin ("Silicone impression material SIM-260" manufactured by Shin-Etsu Chemical Co., Ltd.) with a dimension of 25 mm×45 mm×4 mm

[Measurement of Accumulated Treatment Quantity at Displacement Point in Initial Drop Range]

(1) Treatment with Vacuum Ultraviolet Ray

Figure 2:
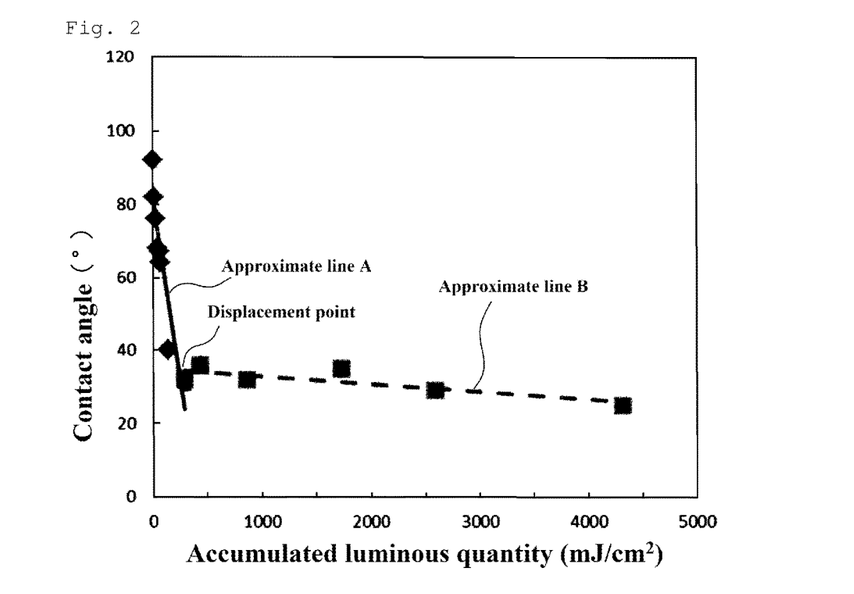
FIG. 2 is a graph showing a variation curve of a water contact angle on a laminating surface with respect to an accumulated luminous quantity applied onto the laminating surface that is obtained from measurement done for Work A employed in Example.
Figure 3:
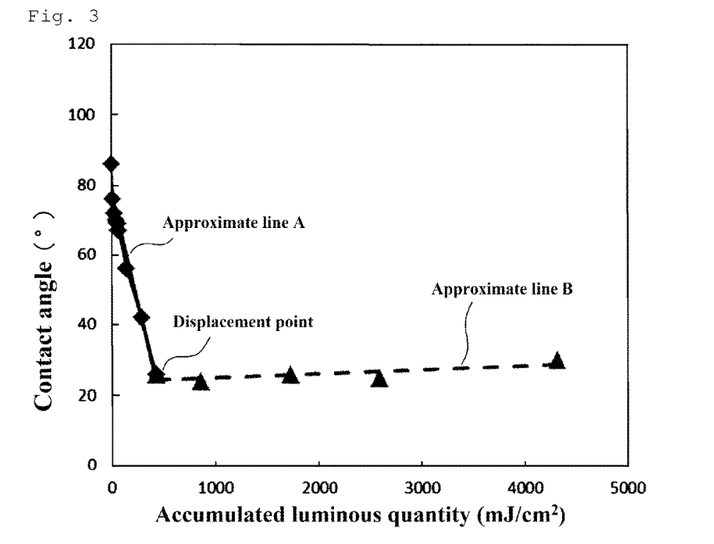
FIG. 3 is a graph showing a variation curve of a water contact angle on a laminating surface with respect to an accumulated luminous quantity applied onto the laminating surface that is obtained from measurement done for Work B employed in Example.
Figure 4:
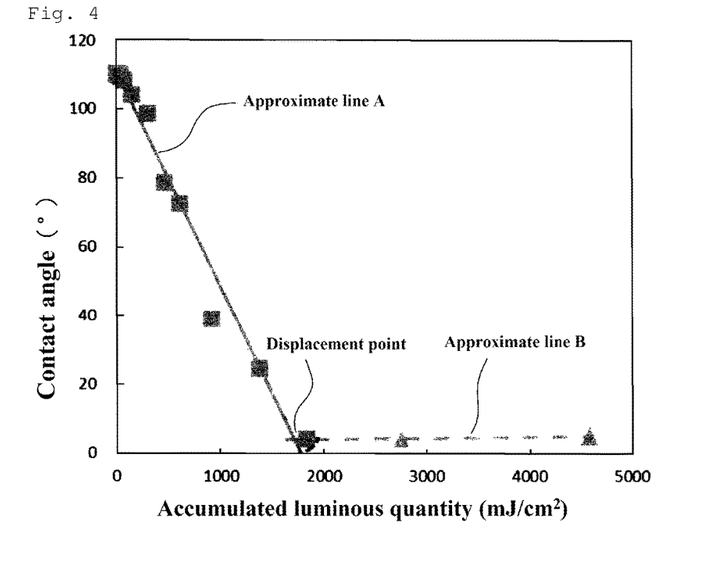
FIG. 4 is a graph showing a variation curve of a water contact angle on a laminating surface with respect to an accumulated luminous quantity applied onto the laminating surface that is obtained from measurement done for Work C employed in Example.

Laminating surfaces of Work A, Work B and Work C were irradiated with vacuum ultraviolet ray at an illuminance ranging from 14.4 to 15.3 mW/cm$^2$. Each time an accumulated luminous quantity on the laminating surfaces reached a predetermined value, a water contact angle on the laminating surfaces was measured. The measured values given of the water contact angle were plotted on a coordinate with its vertical axis representing contact angle and its horizontal axis representing accumulated luminous quantity. A graph obtained for Work A is shown in FIG. 2. A graph obtained for Work B is shown in FIG. 3. A graph obtained for Work C is shown in FIG. 4. From the obtained graph, a displacement point in an initial drop range was determined, and an accumulated luminous quantity at that displacement point was measured.

As a result, an accumulated luminous quantity at the displacement point for Work A was found to be about 250 mJ/cm$^2$; an accumulated luminous quantity at the displacement point for Work B was found to be about 450 mJ/cm$^2$; and an accumulated luminous quantity at the displacement point for Work C was found to be about 1700 mJ/cm$^2$ (2) Treatment with Atmospheric Pressure Plasma According to the configuration shown in FIG. 1, an atmospheric pressure plasma device with specifications described below was fabricated.

Material of casing (10): aluminum

Material of electrode (20): Super Invar (material having a 500 μm alumina film formed on the surface produced by thermal spraying)

Dimension of surface of electrode (20): 50 mm×300 mm

Distance spaced between casing (10) and dielectric layer (21): 0.5 mm

Voltage: 7.0 kVp-p, Frequency: 60 kHz, Normal rated power: 1100 VA

Figure 5:
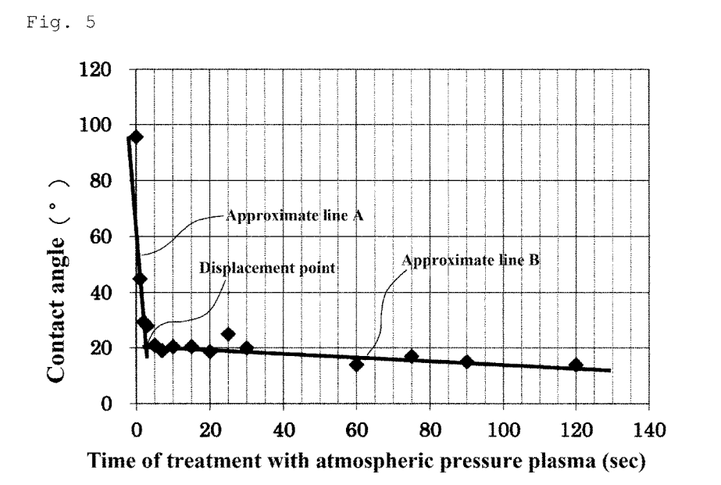
FIG. 5 is a graph showing a variation curve of a water contact angle on a laminating surface with respect to time of treatment with atmospheric pressure plasma that is obtained from measurement done for Work A employed in Example.
Figure 6:
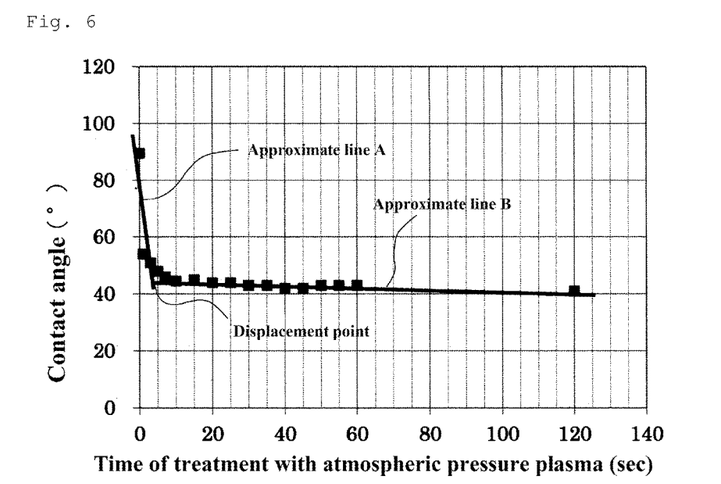
FIG. 6 is a graph showing a variation curve of a water contact angle on a laminating surface with respect to time of treatment with atmospheric pressure plasma that is obtained from measurement done for Work B employed in Example.
Figure 7:
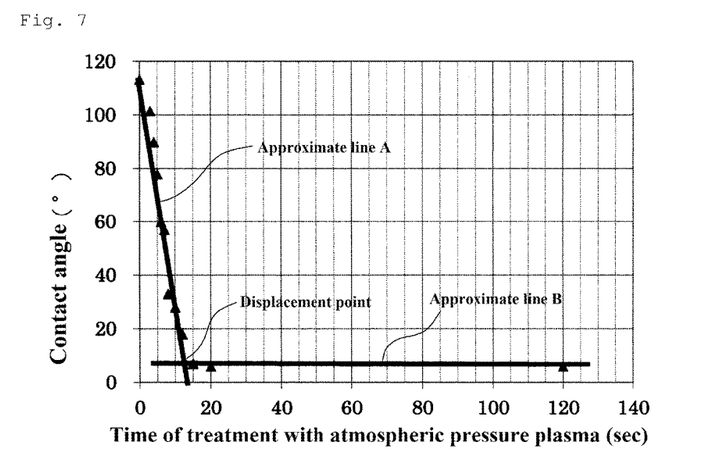
FIG. 7 is a graph showing a variation curve of a water contact angle on a laminating surface with respect to time of treatment with atmospheric pressure plasma that is obtained from measurement done for Work C employed in Example.

Work A, Work B and Work C were placed such that their laminating surfaces were positioned at a distance of 3 mm from the nozzles 12 of the above-mentioned atmospheric pressure plasma device. Subsequently, into the casing 10 of the atmospheric pressure plasma device, gas for plasma generation consisting of nitrogen gas at a low rate of 150 L/min and clean dry air at a flow rate of 1 L/min (oxygen concentration in the gas for plasma generation being about 0.14 vol %) was fed, during which the respective laminating surfaces of Work A, Work B and Work C were exposed to atmospheric pressure plasma released from the nozzles (12) of the atmospheric pressure plasma device operating at a power of 1100 VA. With every passage of a predetermined treatment time, a water contact angle on the laminating surfaces was measured. The measured values given of water contact angle were plotted on a coordinate with its vertical axis representing contact angle and its horizontal axis representing accumulated luminous quantity. A graph obtained for Work A is shown in FIG. 5. A graph obtained for Work B is shown in FIG. 6. A graph obtained for Work C is shown in FIG. 7. From the obtained graph, a displacement point in an initial drop range was determined, and a treatment time at the displacement point as the accumulated treatment quantity was measured.

As a result, a treatment time at the displacement point for Work A was found to be 4 seconds; a treatment time at the displacement point for Work B was found to be 5 seconds; and a treatment time at the displacement point for Work C was found to be 15 seconds.

Experiment 1

Two pieces of Work A were subjected to ultraviolet ray treatment step and bonding step described below for their lamination to each other.
[Ultraviolet Ray Treatment Step]
A laminating surface of each of the two works was irradiated by using a xenon excimer lamp with vacuum ultraviolet ray at an illuminance of 14.4 mW/cm$^2$ for an irradiation time described in Table 1 shown later.

The termination of the ultraviolet ray treatment step was followed by measuring a water contact angle on the laminating surfaces of the works. The results are shown in Table 1.
[Bonding Step]
The two works were stacked on each other such that a laminating surface of one of the works abutted a laminating surface of the other work. The contacting area of the laminating surfaces contacting each other of the two works was 625 mm$^2$. Subsequently, the two works were pressed under a pressure of 2 MPa and a pressurization time of 300 seconds to be bonded to each other.

A tensile shearing strength of the resultant laminate was measured in accordance with JIS K 6850. The result is shown in Table 1.

Figure 8:
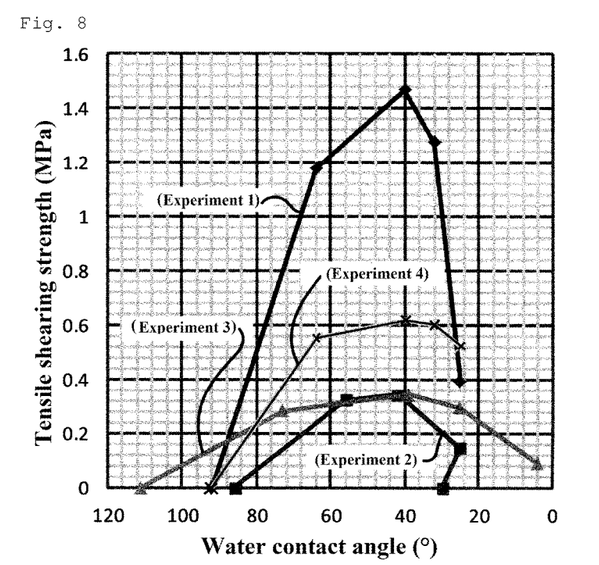
FIG. 8 shows a curve showing relations between a water contact angle on a laminating surface and a tensile shearing strength that is obtained from measurements done for Work A, Work B and Work C in Experiments 1 to 4.

A curve showing the relation between the water contact angle on the laminating surfaces and the tensile shearing strength is shown in FIG. 8.

Experiment 2

Two pieces of Work B were subjected to ultraviolet ray treatment step and bonding step described below for their lamination to each other.
[Ultraviolet Ray Treatment Step]
A laminating surface of each of the two works was irradiated by using a xenon excimer lamp with vacuum ultraviolet ray at an illuminance of 14.4 mW/cm$^2$ for an irradiation time described in Table 1 shown later.

The termination of the ultraviolet ray treatment step was followed by measuring a water contact angle on the laminating surfaces of the works. The results are shown in Table 1.
[Bonding Step]
The two works were stacked on each other such that a laminating surface of one of the works abutted a laminating surface of the other work. The contacting area of the laminating surfaces contacting each other of the two works was 625 mm$^2$. Subsequently, the two works were pressed under a pressure of 2 MPa and a pressurization time of 300 seconds to be bonded to each other.

A tensile shearing strength of the resultant laminate was measured in accordance with JIS K 6850. The result is shown in Table 1.

A curve showing the relation between the water contact angle on the laminating surfaces and the tensile shearing strength is shown in FIG. 8.

Experiment 3

Two pieces of Work C were subjected to ultraviolet ray treatment step and bonding step described below for their lamination to each other.
[Ultraviolet Ray Treatment Step]
A laminating surface of each of the two works was irradiated by using a xenon excimer lamp with vacuum ultraviolet ray at an illuminance of 15.3 mW/cm$^2$ for an irradiation time described in Table 1 shown later.

The termination of the ultraviolet ray treatment step was followed by measuring a water contact angle on the laminating surfaces of the works. The results are shown in Table 1.
[Bonding Step]
The two works were stacked on each other such that a laminating surface of one of the works abutted a laminating surface of the other work. The contacting area of the laminating surfaces contacting each other of the two works was 625 mm$^2$. Subsequently, the two works were pressed under a pressure of 2 MPa and a pressurization time of 300 seconds to be bonded to each other.

A tensile shearing strength of the resultant laminate was measured in accordance with JIS K 6850. The result is shown in Table 1.

A curve showing the relation between the water contact angle on the laminating surfaces and the tensile shearing strength is shown in FIG. 8.

Experiment 4

Work A and Work B, differing from each other in material, were subjected to ultraviolet ray treatment step and bonding step described below for their lamination to each other.
[Ultraviolet Ray Treatment Step]
A laminating surface of each of Work A and Work B was irradiated by using a xenon excimer lamp with vacuum ultraviolet ray at an illuminance of 14.4 mW/cm$^2$ for an irradiation time described in Table 1 shown later.

The termination of the ultraviolet ray treatment step was followed by measuring a water contact angle on the laminating surfaces of the works. The results are shown in Table 1.
[Bonding Step]
Work A and Work B were stacked on each other such that a laminating surface of Work A abutted a laminating surface of Work B. The contacting area of the laminating surfaces contacting each other of the two works was 625 mm$^2$. Subsequently, the two works were pressed under a pressure of 2 MPa and a pressurization time of 300 seconds to be bonded to each other.

A tensile shearing strength of the resultant laminate was measured in accordance with JIS K 6850. The result is shown in Table 1.

A curve showing the relation between the water contact angle on the laminating surfaces and the tensile shearing strength is shown in FIG. 8.

A tensile shearing strength of the resultant laminate was measured in accordance with JIS K 6850. The result is shown in Table 2.

Figure 9:
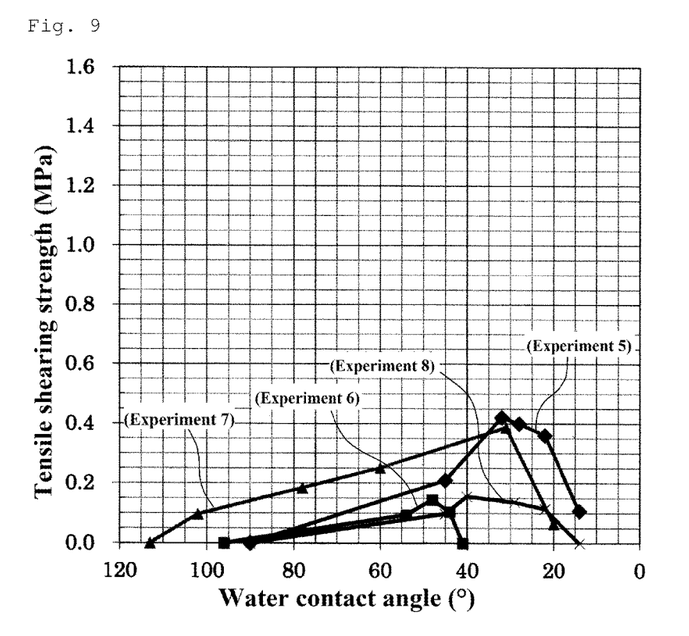
FIG. 9 shows a curve showing relations between a water contact angle on a laminating surface and a tensile shearing strength that is obtained from measurements done for Work A, Work B and Work C in Experiments 5 to 8.

A curve showing the relation between the water contact angle on the laminating surfaces and the tensile shearing strength is shown in FIG. 9.

TABLE 1

| | Type of Work | Accumulated luminous quantity at displacement point (mJ/cm$^2$) | Illuminance of vacuum ultraviolet ray (mW/cm$^2$) | Irradiation time of vacuum ultraviolet ray (sec) | | Accumulated luminous quantity (mJ/cm$^2$) | | Contact angle (°) | | Tensile shearing strength (MPa) |
|---|---|---|---|---|---|---|---|---|---|---|
| Experiment 1 | Work A/ Work A | 250 | 14.4 | 0 | | 0 | | 92 | | 0 |
| | | | | 5 | | 72 | | 64 | | 1.176 |
| | | | | 10 | | 144 | | 40 | | 1.47 |
| | | | | 20 | | 288 | | 32 | | 1.274 |
| | | | | 300 | | 4320 | | 25 | | 0.392 |
| Experiment 2 | Work B/ Work B | 450 | 14.4 | 0 | | 0 | | 86 | | 0 |
| | | | | 10 | | 144 | | 56 | | 0.3234 |
| | | | | 20 | | 288 | | 42 | | 0.343 |
| | | | | 30 | | 432 | | 26 | | 0.147 |
| | | | | 300 | | 4320 | | 30 | | 0 |
| Experiment 3 | Work C/ Work C | 1700 | 15.3 | 0 | | 0 | | 111 | | 0 |
| | | | | 40 | | 612 | | 73 | | 0.2842 |
| | | | | 60 | | 918 | | 39 | | 0.343 |
| | | | | 90 | | 1377 | | 25 | | 0.294 |
| | | | | 300 | | 4590 | | 4 | | 0.0882 |
| Experiment 4 | Work A/ Work B | Work A = 250 Work B = 450 | Work A = 14.4 Work B = 14.4 | Work A 0 | Work B 0 | Work A 0 | Work B 0 | Work A 92 | Work B 86 | 0 |
| | | | | 5 | 10 | 72 | 144 | 64 | 56 | 0.55 |
| | | | | 10 | 20 | 144 | 288 | 40 | 42 | 0.62 |
| | | | | 20 | 30 | 288 | 432 | 32 | 26 | 0.60 |
| | | | | 300 | 300 | 4320 | 4320 | 25 | 30 | 0.52 |

As is clear from the results of Table 1, it was verified that terminating the application of vacuum ultraviolet ray onto the laminating surfaces of the works when the accumulated luminous quantity on the laminating surfaces was within an initial drop range shown in the contact angle/accumulated treatment quantity variation curve gave rise to the laminates attaining a high bonding strength.

Experiment 5

Two pieces of Work A were subjected to plasma treatment step and bonding step described below for their lamination to each other.
[Plasma Treatment Step]
The two works were placed such that their laminating surfaces were positioned at a distance of 3 mm from the nozzles of the atmospheric pressure plasma device, and treated with atmospheric pressure plasma by using the atmospheric pressure plasma device operating under conditions described below.
Gas for plasma generation: nitrogen gas (flow rate=150 L/min) and clean dry air (flow rate=1 L/min)
Electric power applied: 1100 VA
Treatment time: time described in Table 2 shown later
The termination of the plasma treatment step was followed by measuring a water contact angle on the laminating surfaces of the works. The results are shown in Table 2.
[Bonding Step]
The two works were stacked on each other such that a laminating surface of one of the works abutted a laminating surface of the other work. The contacting area of the laminating surfaces contacting each other of the two works was 625 mm$^2$. Subsequently, the two works were pressed under a pressure of 2 MPa and a pressurization time of 300 seconds to be bonded to each other.

Experiment 6

Two pieces of Work B were subjected to the plasma treatment step and the bonding step in the same manner as in Experiment 5 except that the treatment time in the plasma treatment step was changed as shown in Table 2 provided later, for their lamination to each other.

The termination of the plasma treatment step was followed by measuring a water contact angle on the laminating surfaces of the works. The results are shown in Table 2.

A tensile shearing strength of the resultant laminate was measured in accordance with JIS K 6850. The result is shown in Table 2.

A curve showing the relation between the water contact angle on the laminating surfaces and the tensile shearing strength is shown in FIG. 9.

Experiment 7

Two pieces of Work C were subjected to the plasma treatment step and the bonding step in the same manner as in Experiment 5 except that the treatment time in the plasma treatment step was changed as shown in Table 2 provided later, for their lamination to each other.

The termination of the plasma treatment step was followed by measuring a water contact angle on the laminating surfaces of the works. The results are shown in Table 2.

A tensile shearing strength of the resultant laminate was measured in accordance with JIS K 6850. The result is shown in Table 2.

A curve showing the relation between the water contact angle on the laminating surfaces and the tensile shearing strength is shown in FIG. 9.

Experiment 8

Work A and Work B, differing from each other in material, were subjected to the plasma treatment step and the bonding step in the same manner as in Experiment 5 except that the treatment time in the plasma treatment step was changed as shown in Table 2 provided later, for their lamination to each other.

The termination of the plasma treatment step was followed by measuring a water contact angle on the laminating surfaces of the works. The results are shown in Table 2.

A tensile shearing strength of the resultant laminate was measured in accordance with JIS K 6850. The result is shown in Table 2.

A curve showing the relation between the water contact angle on the laminating surfaces and the tensile shearing strength is shown in FIG. 9.

TABLE 2

| | Type of Work | Treatment time at displacement point (sec) | Time of treatment with atmospheric pressure plasma (sec) | | Contact angle (°) | | Tensile shearing strength (MPa) |
|---|---|---|---|---|---|---|---|
| Experiment 5 | Work A/Work A | 4 | 0 | | 90 | | 0.00 |
| | | | 1 | | 45 | | 0.21 |
| | | | 2 | | 32 | | 0.42 |
| | | | 3 | | 28 | | 0.4 |
| | | | 5 | | 22 | | 0.36 |
| | | | 120 | | 14 | | 0.11 |
| Experiment 6 | Work B/Work B | 5 | 0 | | 96 | | 0.00 |
| | | | 1 | | 54 | | 0.09 |
| | | | 5 | | 48 | | 0.14 |
| | | | 10 | | 44 | | 0.10 |
| | | | 120 | | 41 | | 0.00 |
| Experiment 7 | Work C/Work C | 15 | 0 | | 113 | | 0.00 |
| | | | 3 | | 102 | | 0.10 |
| | | | 5 | | 78 | | 0.18 |
| | | | 6 | | 60 | | 0.25 |
| | | | 10 | | 31 | | 0.39 |
| | | | 120 | | 20 | | 0.06 |
| Experiment 8 | Work A/Work B | Work A = 4 Work B = 5 | Work A | Work B | Work A | Work B | |
| | | | 0 | 0 | 90 | 96 | 0.00 |
| | | | 1 | 1 | 45 | 54 | 0.10 |
| | | | 1 | 5 | 40 | 48 | 0.16 |
| | | | 2 | 5 | 29 | 48 | 0.14 |
| | | | 5 | 10 | 22 | 45 | 0.11 |
| | | | 120 | 120 | 14 | 41 | 0.00 |

As is clear from the results of Table 2, it was verified that terminating the treatment of the laminating surfaces with atmospheric pressure plasma when the treatment time with atmospheric pressure plasma (accumulated treatment quantity) was within an initial drop range shown in the contact angle/accumulated treatment quantity variation curve gave rise to the laminates attaining a high bonding strength.

REFERENCE SIGNS LIST

10: Casing
11: Gas feeding inlet
12: Nozzle
20: Electrode
21: Dielectric layer
25: High-frequency power source

The invention claimed is:

1. A process for laminating together a first work composed of a resin and a second work composed of a resin, the process comprising:

a surface activation step of treating a laminating surface of the first work and a laminating surface of the second work with vacuum ultraviolet ray or with atmospheric pressure plasma, and a bonding step of bonding the first work to the second work stacked on each other such that the laminating surface of the first work abuts the laminating surface of the second work, the bonding carried out by any one of methods (1) to (4) below, wherein in the surface activation step, the treatment of the laminating surfaces with vacuum ultraviolet ray or with atmospheric pressure plasma is terminated when an accumulated treatment quantity of the vacuum ultraviolet ray or the atmospheric pressure plasma applied to the laminating surfaces is within an initial drop range shown in a variation curve of a water contact angle on the laminating surfaces with respect to the accumulated treatment quantity, (1): a method of heating the first work and the second work, (2): a method of pressurizing the first work and the second work in the direction of thickness of the works, (3): a method of heating the first work and the second work while pressurizing the first and second works in the direction of thickness of the works, and (4): a method of pressurizing the first work and the second work in the direction of thickness of the works, followed by releasing the pressure, and thereafter heating the works, and wherein in the surface activation step, the treatment of the laminating surfaces with vacuum ultraviolet ray or with atmospheric pressure plasma is terminated before a water contact angle on the laminating surfaces becomes below 30°.

2. The process for laminating works together according to claim 1, wherein in the surface activation step, the treatment of the laminating surfaces with vacuum ultraviolet ray or with atmospheric pressure plasma is terminated after a water contact angle on the laminating surfaces becomes below an initial water contact angle given prior to the surface activation step.

3. The process for laminating works together according to claim 1, wherein a resin constituting the first work and the second work is a cycloolefin resin, an acrylic resin, or a silicone resin.

* * * * *